(12) United States Patent
Cox et al.

(10) Patent No.: US 6,508,049 B1
(45) Date of Patent: Jan. 21, 2003

(54) MASS FLOW RATE SENSOR FOR SUGAR CANE HARVESTER

(75) Inventors: Graeme Justin Cox, Queensland (AU); David Richard Vivian Cox, Queensland (AU); Simon Rixson Zillman, Queensland (AU); Randolf Arthur Pax, Queensland (AU); Derk Machiel Bakker, Albany (AU); Harry David Harris, Queensland (AU)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 09/556,321

(22) Filed: Apr. 24, 2000

(30) Foreign Application Priority Data

Apr. 22, 1999 (AU) .......................................... 23899/99

(51) Int. Cl.⁷ ............................ G01P 1/30; A01D 75/00
(52) U.S. Cl. ........................ 56/10.2 R; 701/50; 73/1.33
(58) Field of Search ........................ 56/10.2 R, 10.2 B, 56/10.2 C, 10.2 G, 10.2 J, DIG. 15; 701/50, 207, 213; 73/861.73, 861.74, 1.33; 177/16, 25.19, 119, 136, 145; 222/56, 57, 77

(56) References Cited

U.S. PATENT DOCUMENTS

| | | | | |
|---|---|---|---|---|
| 3,478,830 A | * | 11/1969 | Levesque et al. ............. | 177/16 |
| 4,765,190 A | * | 8/1988 | Strubbe ................... | 73/861.73 |
| 5,282,389 A | * | 2/1994 | Faivre et al. ............. | 73/861.73 |
| 5,736,652 A | * | 4/1998 | Strubbe ................... | 73/861.73 |
| 5,959,257 A | * | 9/1999 | Campbell et al. ............. | 177/16 |
| 6,014,903 A | * | 1/2000 | Strubbe et al. .......... | 73/861.73 |
| 6,248,963 B1 | * | 6/2001 | Gottlober .................... | 177/136 |
| 6,272,819 B1 | * | 8/2001 | Wendte et al. ............... | 56/11.9 |
| 6,272,935 B1 | * | 8/2001 | Strubbe ................... | 73/861.73 |

FOREIGN PATENT DOCUMENTS

EP              753720         *  1/1997

* cited by examiner

Primary Examiner—Thomas B. Will
Assistant Examiner—Nathan Mammen (57) ABSTRACT

A mass flow sensor apparatus (30) for a billet harvester(10) for sugar cane of the type having an elevator (20) with a plurality of flights (24) that transfer batches of billets (5) through an elevator housing and having a floor section (23) proximate an upper end (22) of the elevator housing, the mass flow sensor apparatus including: a weigh pad (31) for receiving batches of billets (5); a first transducer means (34) operatively associated with the weigh pad for producing mass signals (39) indicative of a mass received by the weigh pad and error correction mechanism (37, 38) for correction of measurement errors in the mass signals; whereby, in use, the weigh pad (31) is substantially co-planar with the floor section (23) in the elevator housing such that batches of billets (5) traverse the weigh pad and the error correction mechanism (37) is operatively associated with the crop harvester (10). A yield mapping system employing DGPS positioning techniques with the mass flow rate sensor is also disclosed.

4 Claims, 9 Drawing Sheets

MASS FLOW RATE SENSOR FOR SUGAR CANE HARVESTER

FIELD OF THE INVENTION

This invention relates to flow rate sensors for use in relation to harvested crops, in particular a mass flow rate sensor adapted for operation in a crop harvester for grass-like crops such as sugar cane or corn silage. In one application, the mass flow rate sensor forms part of a yield monitoring system which can generate grop yield maps and similar data.

BACKGROUND TO THE INVENTION

There exist flow rate sensors developed for the particular requirements of grain crops, including gamma ray absorption, impact plate, capacitive, pivoted auger with load cell and photo-detection techniques, as summarised by S. C. Borgelt and KA. Sudduth in Paper No. 921022 entitled "Grain flow monitoring for in-field mapping", published by The American Society of Agricultural Engineers, 1992. However, these sensors are typically adapted to the particular requirements of grain flow, in particular varying moisture content, that affects the frictional characteristics and bulk density of harvested grain. Grain flow is much more homogeneous than the flow of sugar cane billets, which faces additional problems of crop contamination by dirt and extraneous matter.

EP Patent Document No. 753720 (New Holland Belgium NV) describes a sensor which uses the change of momentum of moving grain flows over a curved plate as an indicator of flow rate. The plate is pivoted about a point chosen so that the momentum being measured in independent of the friction between the grain and the plate. Its correct operation depends on there being a continuous flow of material over the sensor.

U.S. Pat. No. 5,282,389 (Bassett et al.) describes an actuating arm projecting into a flow of grain being discharged from an elevator and uses the force of impact on a plate to measure mass flow. This sensor is particularly suited to grain harvesters when the flow of material is well controlled and confined.

German Patent Document No. 19524752 (Class KGAA) describes a system for calibrating measurement of material flow wherein material which has passed the flow sensor is selectively deflected into a measuring chamber for weighing. The system is arranged to automate the collection and weighing of a calibration sample while minimising the obstruction of material flow in an agricultural machine.

There have also been attempts to modify mass flow rate sensing techniques used in relation to forage crops, such as instrumenting the base unit drive shaft and blower shaft of a silage harvester with torque and speed sensors. R. Vansichen and J. de Baerdemaker found that silage flow rate was proportional to the measured power on each shaft, as set out in the article "A measurement technique for yield mapping of corn silage", published in the Journal of Agricultural Engineering Research, Vol.55, 1993.

The present applicants investigated the instrumentation of the hydraulic drive systems for the chopper and the elevator in a cane harvester, as discussed by G. Cox, H. Harris and R. Pax and R. Dick in the paper "Monitoring cane yield by measuring mass flow rate through the harvester" as published in the *Proceedings of the* 1996 Australian Society of Cane Technologies Conference1996. (A copy of this paper is annexed to the specification of Australian Provisional Patent Application, No. PP3089 dated Apr. 22, 1998.)

Australian Patent Application No. 35171/89 (Massey-Ferguson Australia) describes a crop flow monitoring technique whereby the torque requried to drive a threshing drum is employed for prompting the manual adjustment of harvester speed. Whilst PCT International Document No. WO 97/09592 describes an agricultural trailer for carrying portions of a crop as it is harvested, the trailer typically being towed alongside an operating harvester. The trailer also carries instrumentation for weighing the accumulating produce after harvesting and processing, which instrumentation is connected to GPS and data logging to provide yield maps. However, every trailer used for the harvest would require such a system which is uneconomical if applied to harvesting sugar cane. Furthermore the weighing system must operate over a large scale of accumulated weight thus introducing inaccuracies into the system.

The applicants have also conducted further development and testing of a yield monitoring system for sugar can using simplified mass flow rate sensors, for the chopper and elevator systems in a cane harvester, and a differential global positioning system (DGPS) technique. The results of this development are set out by G. Cox, H. Harris and R. Pax in the paper "Development and testing of a prototype yield mapping system" as presented to the ASSCT 1997 Conference held n Cairns, Australia. (A copy of this paper is also annexed to the abovementioned Australian provisional specification.)

The operating environment of a cane harvester is generally harsh, with a significant amount of mechanical noise, air flow and vibration which can have adverse effects on sensors used to determine mass flow rate. Further, cane harvesters operate in dirty or muddy environments and thus are often subject to periodic cleaning using high pressure liquid jets to dilodge dirt, mud and extraneous matter which tends to accumulate. The accumulation of dirt, mud and extraneous matter, along the subsequent cleaning, can have a deleterious effect on sensor components.

OBJECT OF THE INVENTION

It is an object of the present invention to provide a mass flow rate sensor apparatus and method for use in harvesting grass-like crops which ameliorates or overcomes at least some of the problems associated with the prior art.

It is another object of the invention to provide a mass flow rate sensor apparatus and method which is adapted for use in billet harvesters for sugar cane.

It is another object of the invention to provide a mass flow rate sensor apparatus and method which may be conveniently integrated into a crop yield mapping system.

It is an yet another object of the invention to provide a crop yield mapping system.

Further objects will be evident from the following description.

DISCLOSURE OF THE INVENTION

In one aspect, although it need not be the only or indeed the broadest aspect, the invention resides in a mass flow rate sensor apparatus for a crop harvester having a floor section which is traversed by stalk portions of the harvest crop, said mass flow sensor apparatus including:

a) a weigh pad for receiving portions of the harvested crop;

b) first transducer means associated with the weigh pad for producing mass signals indicative of a mass received by the weigh pad; and c) error correction means for correction of measurement errors in said mass signals;

d) whereby, in use, the weigh pad is mounted in the crop harvester at a location substantially co-planar with the floor section such that portions of the harvested crop traverse said weigh pad and the error correction means is operatively associated with said crop harvester.

Preferably the weigh pad includes a plate member that, in use, is movable with respect to the floor section.

In one form of weigh pad the plate member includes hinge means provided adjacent one end whereby, in use, the plate moves pivotally within an aperature in said floor section.

In another form of weigh pad the plate member includes guides or flexible supports whereby, in use, the plate member moves rectilinearly within an aperature in said floor section.

Suitably the first transducer means includes at least one load cell arranged to support the weigh pad.

In said one form of weigh pad, first transducer means includes at least one load cell disposed adjacent a second end of the plate member opposite said first end thereof.

In said other form of weigh pad, the first transducer means includes at least three load cells disposed under the plate member.

If required, the mass flow sensor apparatus further includes adjustable mounting means for said load cells enabling equalization of the output signals of respective load cells.

The error correction means may include an accelerometer for measuring vertical accelerations of the harvester to enable correction of mass measurements.

The error correction means may include an inclinometer for measuring the inclination of the weigh pad to enable correction of mass measurements.

Preferably the error correction means includes pre-processing means for periodically re-setting calibration of the tranducer means.

Suitably the pre-processing means is coupled to a proximity sensor that, in use, is arranged to cause said pre-processing means to re-set the calibration when there are no stalk portions on said weigh pad.

In a second aspect, the invention resides in a mass flow sensor apparatus for a billet type harvester for harvesting sugar cane, having an elevator with a plurality of flights that transfer batches of billets through an elevator housing and having a floor section proximate an upper end of the elevator, said mass flow sensor apparatus including:

a) a weigh pad for receiving batches of billets;

b) first transducer means operatively associated with the weigh pad for producing mass signals indicative of a mass received by the weigh pad; and c) error correction means for correction of measurement errors in said mass signals;

d) whereby, in use, the weigh pad is substantially co-planar with the floor section in the elevator housing such that batches of billets traverse the weigh pad and the error correction means is operatively associated with the billet type harvester.

Preferably the weigh pad includes a plate member that, in use, is movable with respect to the floor section.

Suitably first transducer means includes at least one load cell arranged to support the weigh pad.

In preference the error correction means includes a pre-processing means for periodically re-zeroing calibration of the transducer means.

Preferably the pre-processing means is coupled to a proximity sensor that, in use, is arranged to cause said pre-processing means to re-zero the calibration when there are not billets on said weigh pad.

The proximity sensor may be of the inductive type and arranged to detect the passage of flights over the weigh pad.

The proximity sensor may be either of the optical type or of the capacitive type and arranged to detect an absence of billets on the weigh pad.

If required, the mass flow sensor apparatus may further include second transducer means operatively associated with elevator drive means for producing a speed signal indicative of the speed of the elevator drive means which drive said plurality of flights.

In a third aspect the invention may reside in a crop harvester, said harvester including a floor section which is traversed by stalk portions of a harvested crop and characterised by a mass flow sensor apparatus as set out above in relation to the first aspect of the invention.

Alternatively, the invention may reside in a billet type harvester for harvesting sugar cane, said harvester having an elevator with a plurality of flights that transfer batches of billets through an elevator housing with a floor section and an elevator drive means that drives said plurality of flights and characterised by a mass flow sensor apparatus as set out above in relation to the second aspect of the invention.

The billet type harvester may have an elevator with an extractor fan at an upper end thereof and include an air flow damper disposed between the weigh pad and the extractor fan.

Suitably the air flow damper includes a flexible curtain extending down from a ceiling of the elevator housing.

In a fourth aspect of the invention there is provided a method for sensing mass flow of a harvested crop in a crop harvester, which crop harvester has a floor section that is traversed by portions of a harvested crop, said method including the steps of:

a) weighing said portions of the harvested crop during traverse of the floor section to produce mass signals; and b) correcting measurement errors in said mass signals, caused at least in part by crop harvester operations, to produce corrected mass measurements.

Preferably the step of weighing the portions of the harvested crop involves weighing said portions traversing a weigh pad that is provided in a substantially co-planar relation with the floor section of the harvester.

Suitably the step of correcting errors in mass signals further includes the step of periodically re-zeroing calibration applied to said mass signals when there are no harvested crop portions traversing the weigh pad.

In one form, the method further includes the step of calculating the mass flow rate using an average of a plurality of corrected mass signals obtained for each portion of said harvested crop.

In another form of the method, wherein the harvester is of the billet type having an elevator with a plurality of flights that transfer batches of billets through an elevator housing wherein said floor section is proximate an upper end of the elevator, further including the step of calculating the mass flow rate using one corrected mass signal obtained for each batch immediately prior to passage of a respective flight over the weigh pad.

In a fifth aspect of the invention there is provided a yield mapping system for a sugar cane crop, said system including:

i) a mass flow sensor apparatus as set out above in relation to the first or second aspects of the invention;

ii) a harvester ground speed sensor for providing, in use, ground speed signals indicative of the speed of the harvester;

iii) a differential global positioning system (DGPS) means for generating position signals indicative of harvester position within a field containing the crop;
iv) a pre-processor coupled to the mass flow sensor apparatus, the ground speed sensor and the DGPS means for recording the mass signals, ground speed signals and position signals against a common time base; and
v) processing means for producing a yield map from the recordings of said mass, ground speed and position signals.

BRIEF DETAILS OF THE DRAWINGS

To assist in understanding the invention preferred embodiments will now be described with reference to the following figures in which.

DETAILED DESCRIPTION OF THE PREFERRED EMBODIMENTS

Figure 1:
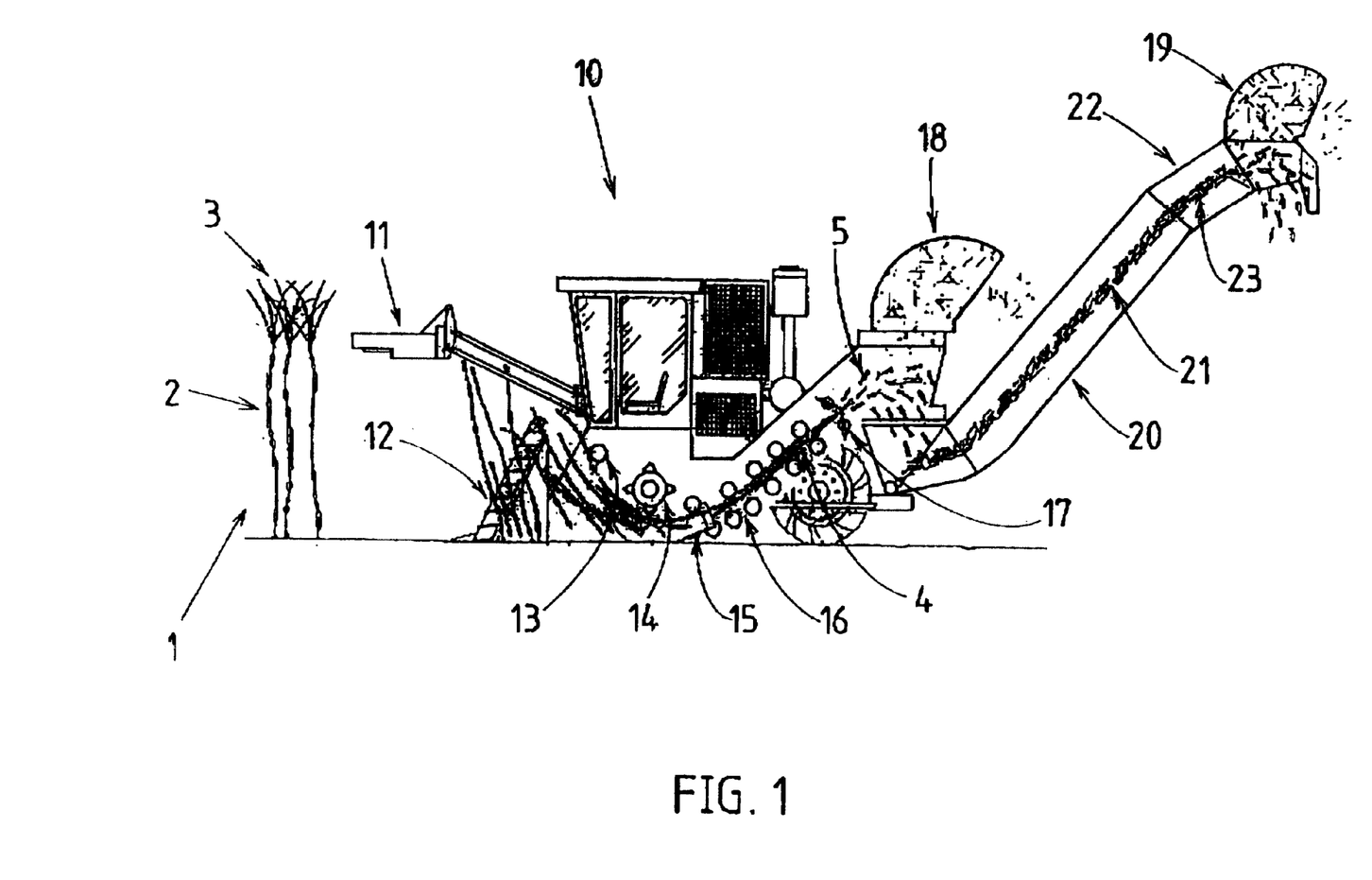
FIG. 1 is a diagrammatic view of a billet type harvester suitable for harvesting sugar cane.

Referring to FIG. 1, the main components of a crop harvester 10 of the chopper of billet type suitable for sugar cane are illustrated. Sugar cane 1 is generally planted in rows typically 1.5 meters apart and produces stalks 2 of two (2) to four (4) meters in length and approximately 25 to 50 mm in diameter. The crop is normally harvested annually, either 'green' or after being burnt to remove leaf material. The harvester includes topper blades 11, for removing the uppermost portion 3 of the standing sugar cane, crop divider cylinders 12, a knock-down roller 13, a fin roller 14 and base cutters 15 for cutting the stalks at ground level. Feed rollers 16 supply the cut can stalks 4 to chopper blades 17 which divide the stalks into portions 5 of some 200 to 300 mm in length, which portions are generally known as billets.

Extraneous matter, including any residual tops, leaves and trash is extracted pneumatically by a primary extractor 18 and later by a secondary extractor 19. The can billets 5 are passed into an inclined elevator 20 for transfer into bins. The elevator includes drive means, suitably in the form of a motor, for driving chained flights or slats (not shown) which push the billets 5 over a fixed floor 21. The billets are transferred from the chopper blades 17 to an upper end of the elevator (below the secondary extractor 19), where they are dropped into a bin normally travelling alongside the harvester. In one form of the invention, the mass flow rate sensor 30 is preferably mounted within the upper part 22 of the elevator 20.

Figure 2:
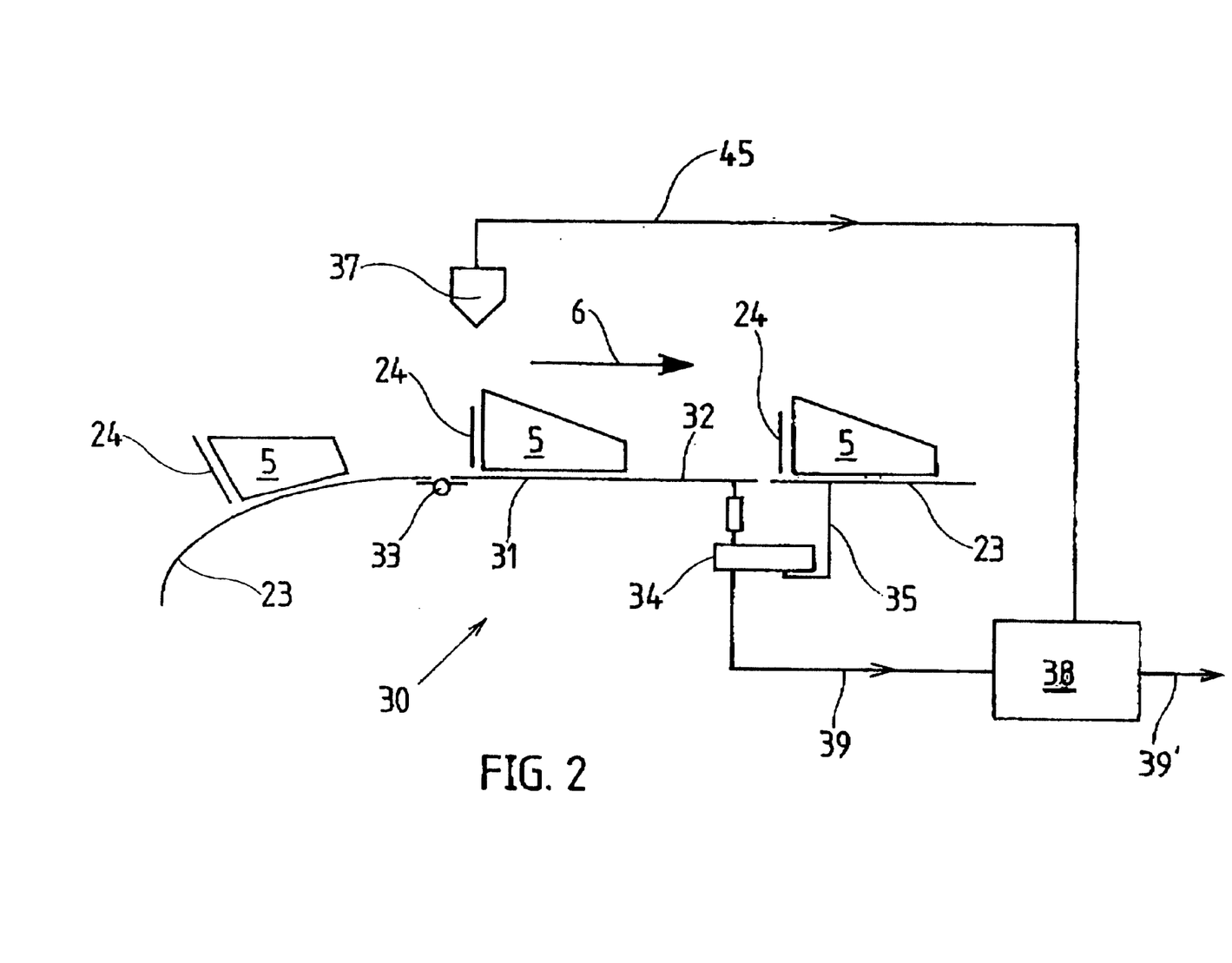
FIG. 2 is a diagrammatic view of a mass flow rate sensor of a first embodiment of the invention.

FIG. 2 is a diagrammatic representation of a mass flow rate sensor of a first embodiment of the invention, in use in the elevator of a sugar cane harvester. The mass flow rate sensor 30 includes a weigh pad 31 disposed in a substantially co-planar relation with a section 23 of the floor in the upper part 22 of the elevator. The weigh pad 31 preferably incorporates a plate member 32 pivotally mounted with respect to the floor section 23 by means of hinges 33. Suitably the hinges 33 are disposed on the plate member 32 at a front end thereof with respect to the direction of flow 6 of the cane billets 5.

The mass flow rate sensor further includes first transducer means 34, preferably in the form of at least one load cell, arranged to support an end of the plate member 32 opposite the hinged end thereof. The load cell(s) are suitably mounted between a lower surface of the plate member 32 and a support member 35.

The flights 24 of the elevator push batches of cane billets 5 across the floor section 23 such that the billets traverse the upper surface of the weigh pad plate 32. Thus the cane billets may be weighed during their traverse of the weigh pad. Mass signals 39 provided by the transducer means 34, in response to deflection of the weigh pad, are typically conditioned, sampled and stored against a time base in a data recorder for subsequent post-processing.

The principle of the measurement of mass flow rate on a moving elevator or conveyor is shown in the following equation:

$$F(t)=M*V \ldots \quad (1)$$

where:
F(t) is mass flow rate [kg/s]:
M is mass of material per unit length [kg/m]; and
V is linear speed of mass of material [m/s].

In the first embodiment, the pivoting action of the weigh pad plate 32 causes the load cell to only measure half the mass passing over the plate. Thus the actual calculation of mass flow rate the first embodiment is:

$$F_1(t)=(M_{sv}*2*V_{elev})/L_{pad} \ldots \quad (2)$$

where:
$F_1(t)$ is mass flow rate [kg/s];
$M_{sv}$ is average mass on load cell [kg];
$V_{elev}$ is the speed of the elevator [m/s]; and
$L_{pad}$ is the length of the plate member [m].

The length of the plate member is known and the elevator speed may be assumed to be consistant. The mass signals 39 are averaged for the calculation of mass flow rate. Other embodiments may include a second transducer operatively associated with elevator drive means, such as a magnetic pick-up device on a shaft of the motor driving the flights 24, in order that the linear speed of the elevator may be calculated dynamically.

The operating environment of a crop harvester can cause errors to be introduced into the mass signals 39 produced by the first transducer means 34. In order to address this problem, error correction means operatively associated with the crop harvester are provided for the purpose of correcting measurement errors. Examples of suitable error correction means include an accelerometer, for correcting the mass flow rate measurements for any vertical acceleration component imposed by the harvester, and an inclinometer, for correcting the mass flow rate measurements for any variation in slope of the weigh pad receiving plate. The error correction means may either provide output signals to a data recorder for storage and later use, or to a pre-processor for treatment of the mass signals in real time to produce corrected data.

The gradual accumulation of dirt, mud and extraneous matter around the weigh pad, particularly at the edge of thereof, during harvesting operations can also introduce errors into the mass signals. A preferred error correction means for periodically re-setting calibration settings of the load cells in illustrated schematically in FIG. 2. Normally, the weigh pad is calibrated by recording the output of the load cells corresponding to a zero mass on the weigh pad, thereby 'zeroing' the sensor apparatus. Generally this zeroing is done manually prior to the commencement of harvesting operations or by slaving the calibration process to the starting of the elevator drive motor to record initial mass signals corresponding to a no-load condition of the weigh pad.

However, the accumulation of extraneous matter during operations can cause the zero mass calibration of the flow rate sensor to drift, producing erroneous mass signals. Accordingly the mass flow rate sensor of the embodiment of FIG. 2 further includes a proximity sensor 37 which is arranged to cause re-zeroing of load cell calibration when there are no harvested crop portion on the weigh pad 31. This may be achieved by removing one of the series of equally spaced flights 24 (see FIGS. 6 and 7) from the drive chain 28. There will then always be one period during revolution of the elevator drive chain when the weigh pad 31 is empty.

A proximity sensor of the inductive type can suitably be mounted to detect the missing flight in order to predict the no-load condition and cause a pre-processor 38 to re-zero the calibration accordingly. Most suitably, the pre-processor combines the mass signals corresponding to a no-load condition with the existing zero calibration using an averaging or first order lag calculation to re-set the calibration of the weigh pad. Alternative proximity sensor arrangements include capacitive or optical type sensors to directly detect the absence of crop portions on the weigh pad. Other pre-processing of the mass signals, such as voltage to frequency conversion, filtering and analog—to—digital conversion, as known to those skilled in the field of data acquisition, may also be conducted.

Figure 3:
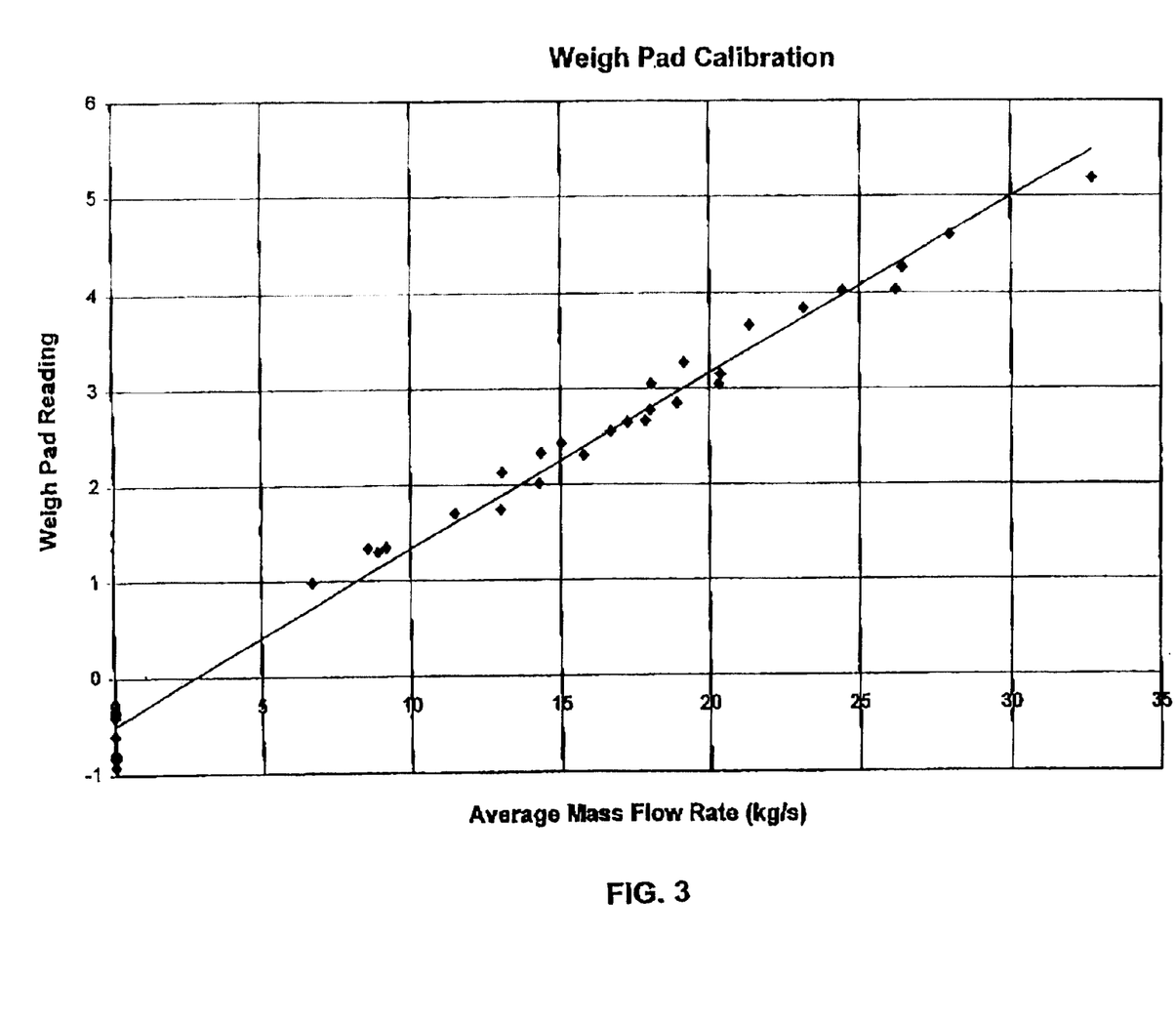
FIG. 3 is a graph showing load cell readings plotted against mass flow rate.

FIG. 3 shows a graph illustrating the performance of the first embodiment of the mass flow rate sensor as discussed below in more detail in relation to FIGS. 4 and 5. The Y axis of the graph is the average reading of the transducer output signals taken over harvesting time. The X axis is the average mass flow rate of cane billets, taken by dividing the harvested mass by the time to harvest. It is apparent from the graph that a strong correlation exists between the mass flow rate and the transducer output.

Figure 4:
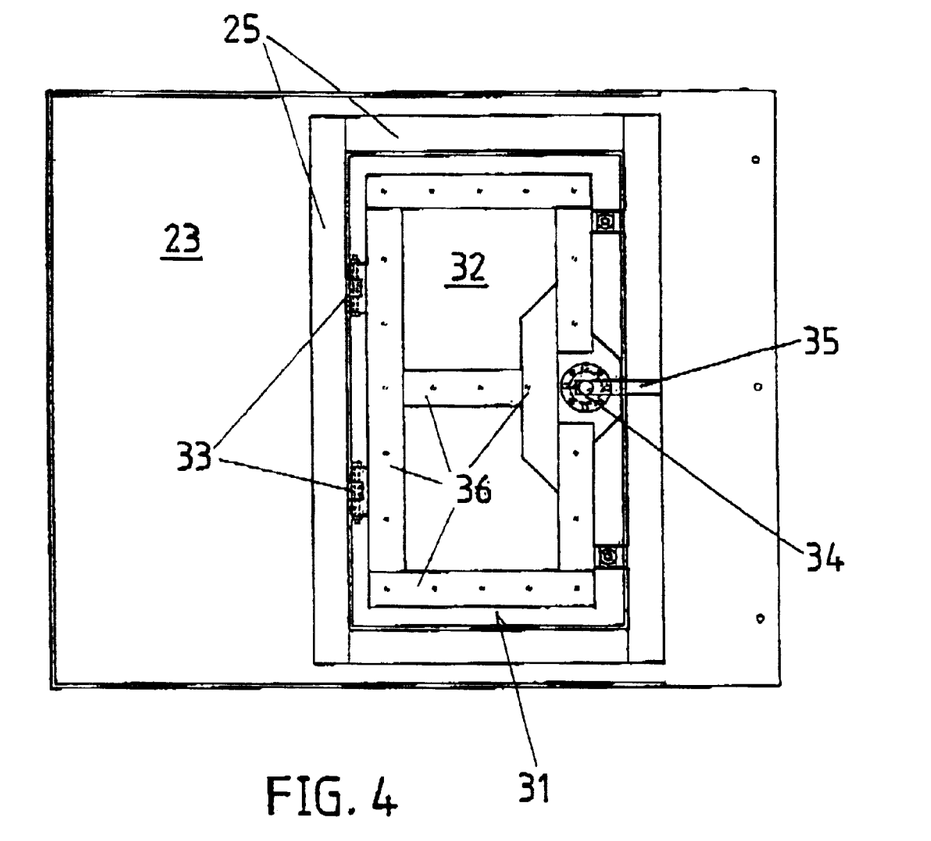
FIG. 4 is a bottom plan view of a weigh pad and transducer arrangement of the first embodiment.
Figure 5:
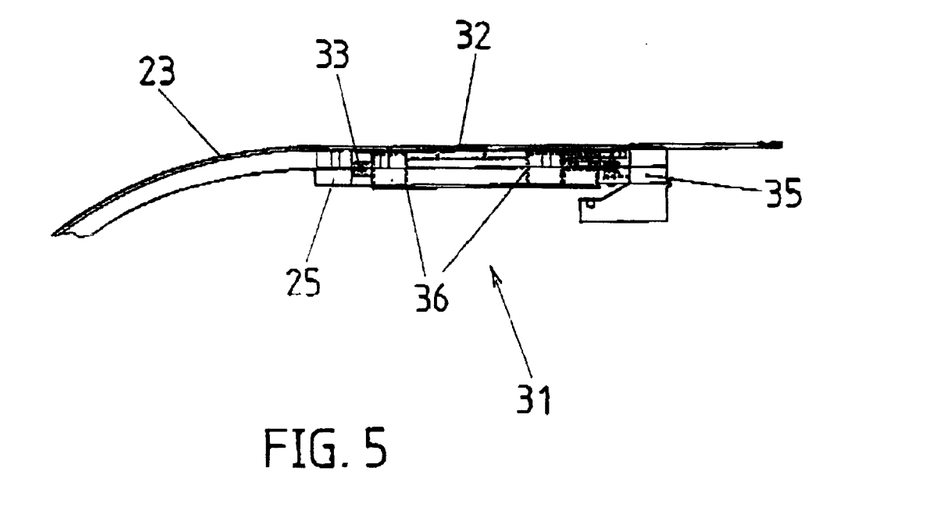
FIG. 5 is a side elevational view of the weigh pad and transducer arrangement of the first embodiment.

Details of the first embodiment of the mass flow rate sensor of the invention are illustrated in FIGS. 4 to 7 of the drawings. FIG. 4 depicts the underside of the weigh pad 31 disposed in an aperture of the elevator floor section 23. A rigid sub-frame 25 is located about the periphery of the aperture to provide structural integrity and mounting points for hinges 33. The hinges 33 are also mounted on an inner supporting frame 36 for the plate member 32, such that the pad pivots adjacent its front end. The pad 31 is supported at its rear end by a load cell 34 carried by a supporting bracket member 35, which bracket is mounted on the subframe 25. A gap of about 7 mm between the edge of plate member 32 and the peripheral sub-frame 25 gives optimum balance between allowing dirt/mud to pass through while preventing cane/trash from jamming the weigh pad. A further improvement may be obtained by providing an overhang of at least 10 mm between the edge of the aperture in the elevator floor and the sub4rame 25. Thus allows mud and extraneous matter to fall through the gap more readily, with less change of sticking to the sub-frame 25

The plate member 32 provides a low friction, wear resistant face, typically a plastics material of high molecular weight such a UHMW polyethylene, on its upper surface, whilst being strengthened by the supporting frame 36 constructed of a lightweight rigid material such as aluminum. In an alternative arrangement the weigh pad 31 may be constructed in one piece using fibre composite materials. Use of a single load cell overcomes the requirement for balancing two such transducers, which normally requires adjustable independent mountings for each load cell as discussed above.

The first embodiments uses a weigh pad pivoted at one end and supported by one or two load cells proximate an end opposite to the pivoted end. Thus the instantaneous load cell outputs depend on the actual position of a batch of billets on the pad, rising from a minimum at the leading edge to a maximum at the trailing edge for each batch of billets. Accordingly a simple averaging of the data is undertaken to smooth this variation in instantaneous output, suitably in conjunction with the error correction process.

In an alternative arrangement of the first embodiment, the relative locations of the hinges 33 and load cell 34 may be reversed with respect to the direction of flow 6 of the billeted crop portions 5. The front end of the weigh pad can be positioned slightly lower (for example 2 mm) than the surface of the elevator floor and the rear (hinged end) of the plate positioned very slightly (for example 1 mm) below the floor. This alternative arrangement allows mud to fall onto the weigh plate surface and travel to the rear of the plate where accumulation of mud is far less likely to affect load cell outputs. Furthermore the tendency of the flights to push the billets down onto the weigh plate is reduced by its slightly lower position. Although possibly more vulnerable to failure by connection with the elevtor flights 24, the alternative arrangement provides improved tolerance to muddy conditions.

Figure 6:
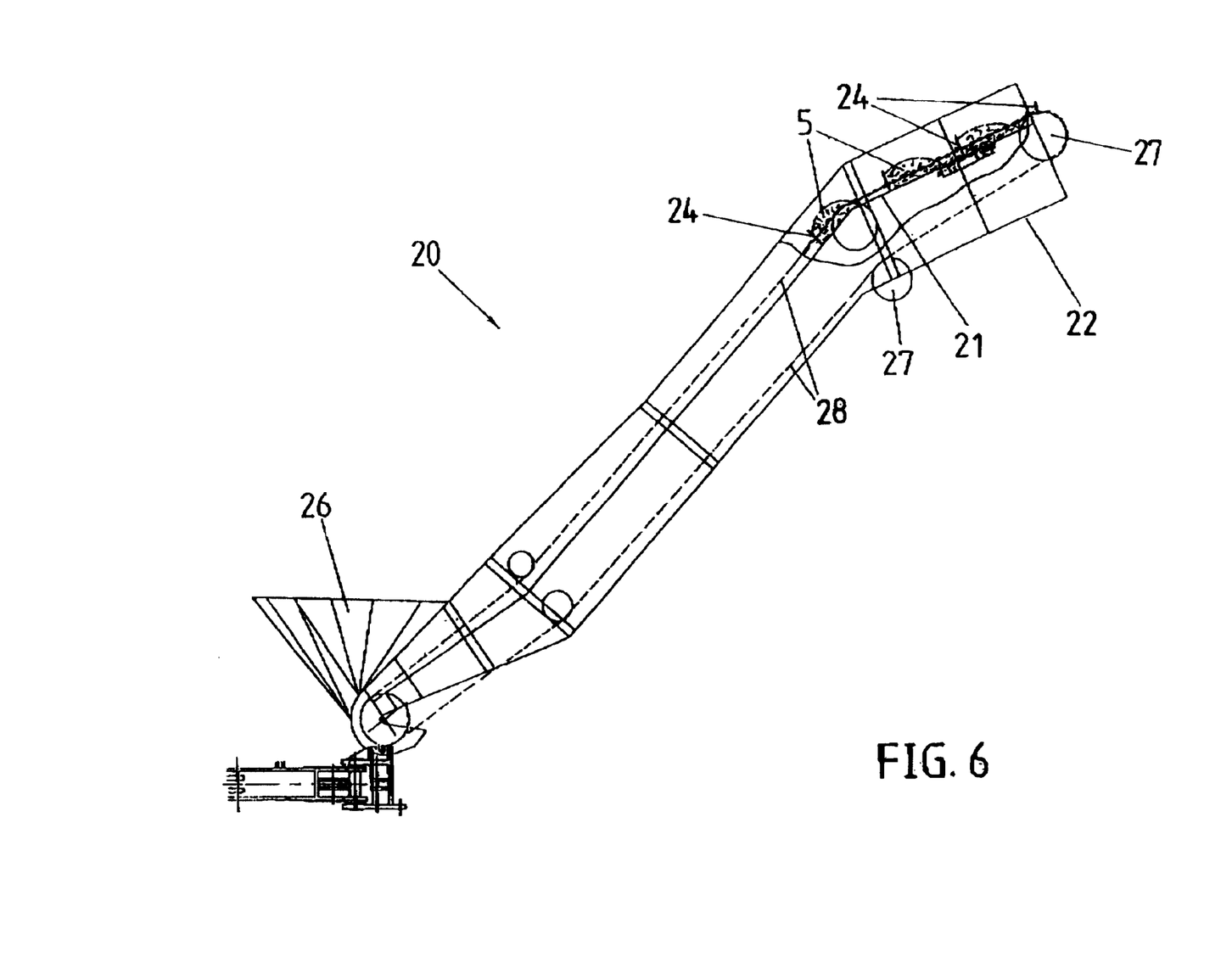
FIG. 6 is a side elevational view of an elevator of the sugar cane harvester of FIG. 1.

FIG. 6 is an enlarged view of the elevator 20 of the harvester depicted in FIG. 1. The cane billets 5 produced by the chopper blades 17 are collected by a hopper 26. Batches of billets are collected by a series of paddles or flights 24 which push groups of billets up a fixed inclined floor 21 within an elevator housing, as depicted in the cutaway portion at the upper part 22 of the elevator. The flights 24 are driven by a drive means, suitably a motor (not shown), via an arrangement of sprockets 27 and a cooperating chain 28 carrying the flights 24.

Figure 7:
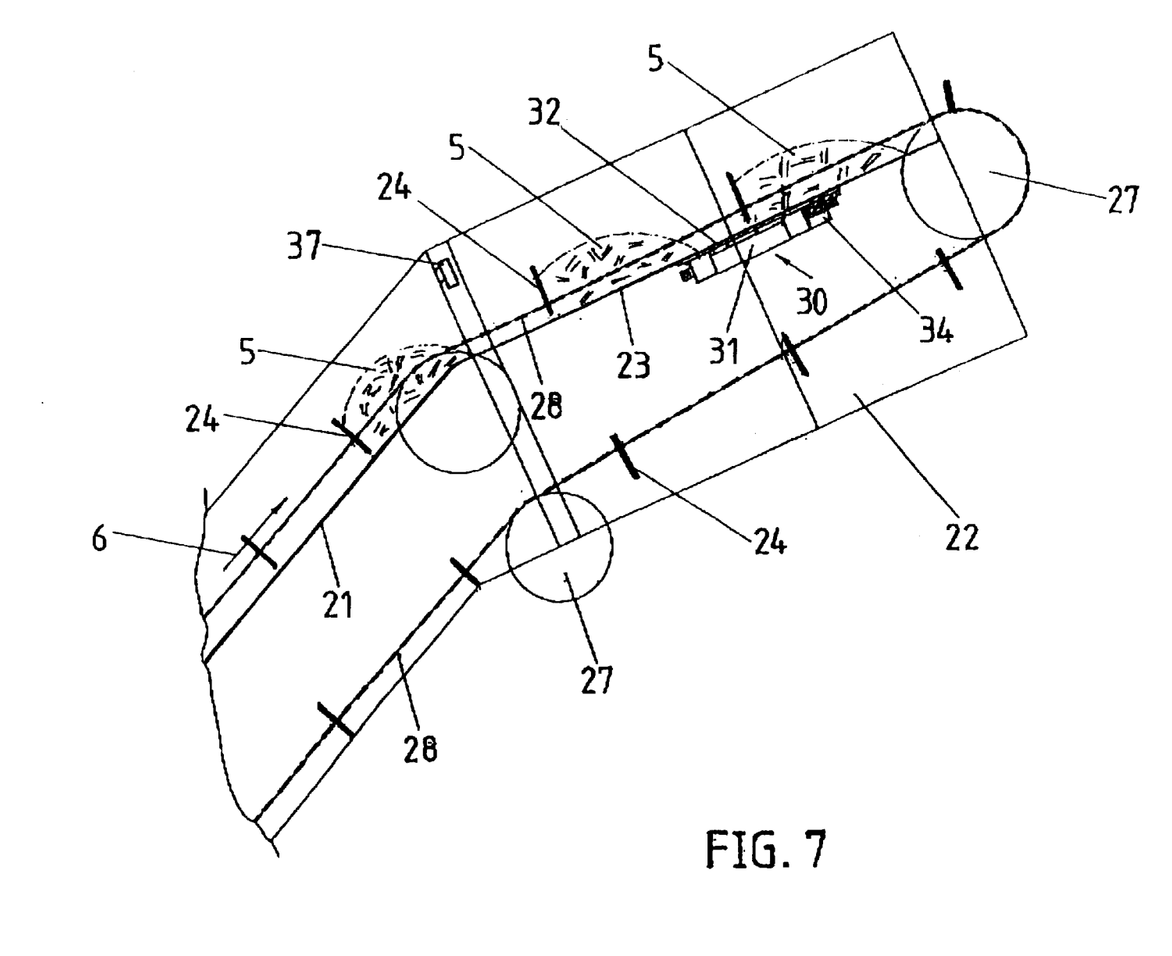
FIG. 7 is a side elevational view showing the weigh pad and transducer arrangement installed in the elevator depicted in FIG. 6.

FIG. 7 is an enlarged drawing showing the location of the mass flow rate sensor 30 in the upper part 22 of the elevator 20. For the purposes of clarity, only the components of the weigh pad 31, including the plate member 32, load cell 34 and proximity sensor 37 are identified in the drawing. The proximity sensor 37 is located one flight space before the front end of the pad so that the pre-processing means 38 conveniently has advance warning of the passing flights. The proximity sensor 37 may be located any integral number of flights away from the front end of the weigh pad plate. It may be advantageous to locate the proximity sensor on the return path of the elevator chain 28, remote from the billet transport path.

The proximity sensor output may also be used to reject load cell outputs which occur when a flight 24 is passing directly over the weigh pad 24.

It will be appreciated that if any extraneous matter and/or billets become jammed between a flight and the fixed floor 21, the load cell output is likely to be erroneous as the jammed flight traverses the weigh pad plate 32. These can be appropriately rejected by the pre-processor 38.

Figure 8:
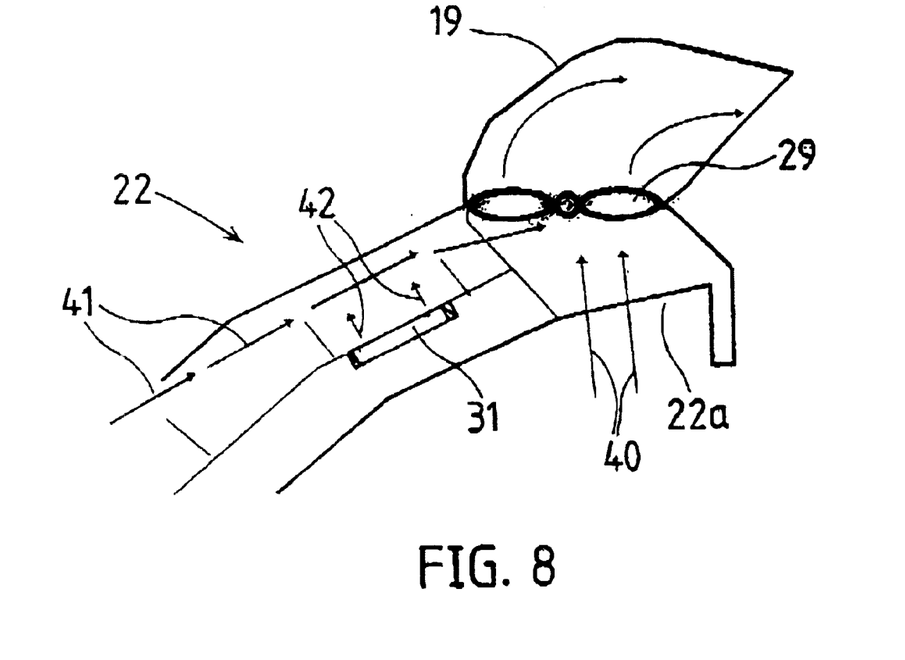
FIG. 8 is an enlarged side elevational view of the upper end portion of the elevator depicting the operation of a secondary extractor fan.

FIG. 8 illustrates schematically the direction of the air flow induced by an extraction fan 29 mounted substantially horizontally in the secondary extractor 19. Most air 40 is drawn in via an open end 22a of the upper part 22 of the elevator. The billets fall through this open end 22a (see FIG. 1) which is directly below the extraction fan 29. However, the extraction fan also draws air 41 from the elevator, creating a pressure differential within the elevator housing resulting in a suction force 42 on the weigh pad 31. The suction force can, in certain harvester applications, increase the mass signals by up to 30% during the normal flow of billets.

Figure 9:
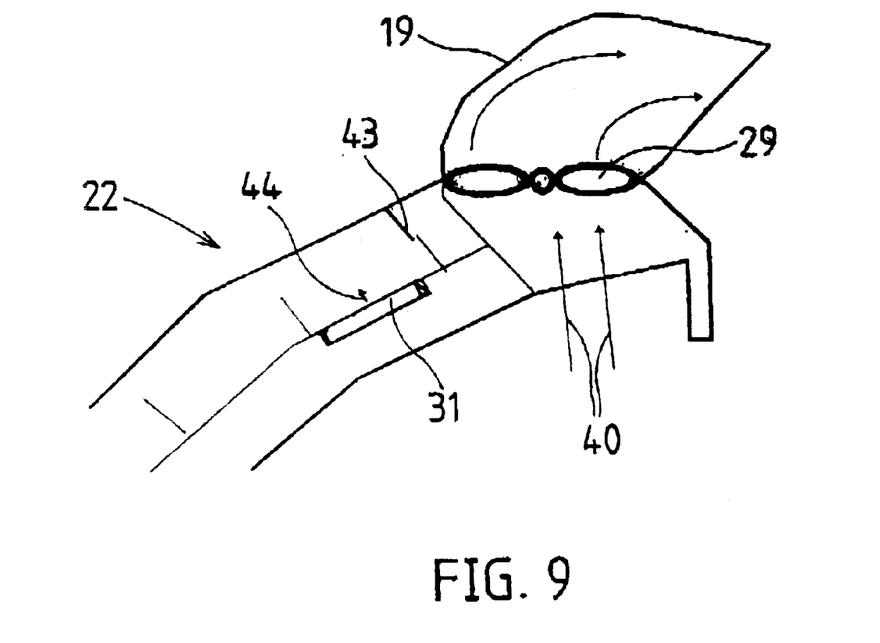
FIG. 9 is a further side elevational view of FIG. 8 with air flow damper means.

In order to address this problem an air flow damper may be installed in the upper end of the elevator 22 between the weigh pad 31 and the extractor fan 191 as illustrated in FIG. 9, to reduce the pressure differential across the weigh pad. The air flow damper preferably takes the form of a resilient curtain 43 extending down from a ceiling of the elevator housing. The curtain is suitably a sheet of rubber which is attached to the ceiling by a suitable bracket member. The air flow damper reduces the air flow in the elevator such that the suction force 44 on the weigh pad is reduced by approximately 75%.

Figure 10:
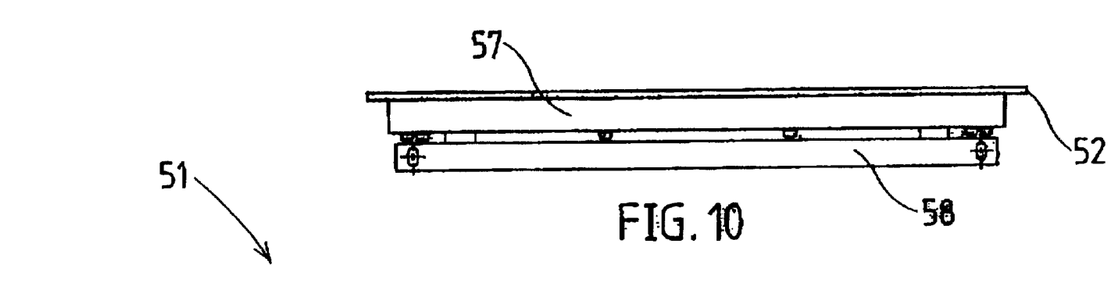
FIG. 10 is an side elevational view of a weigh pad of a second embodiment of the invention.
Figure 11:
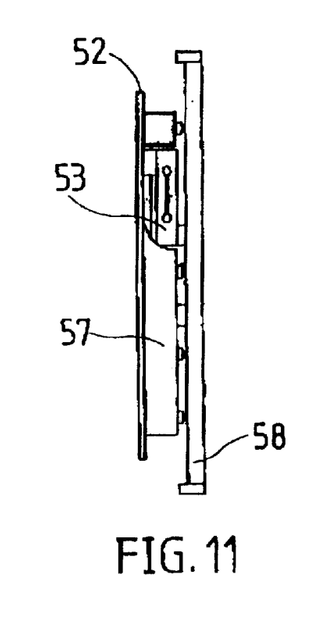
FIG. 11 is an end elevational view of a weigh pad of the second embodiment.
Figure 12:
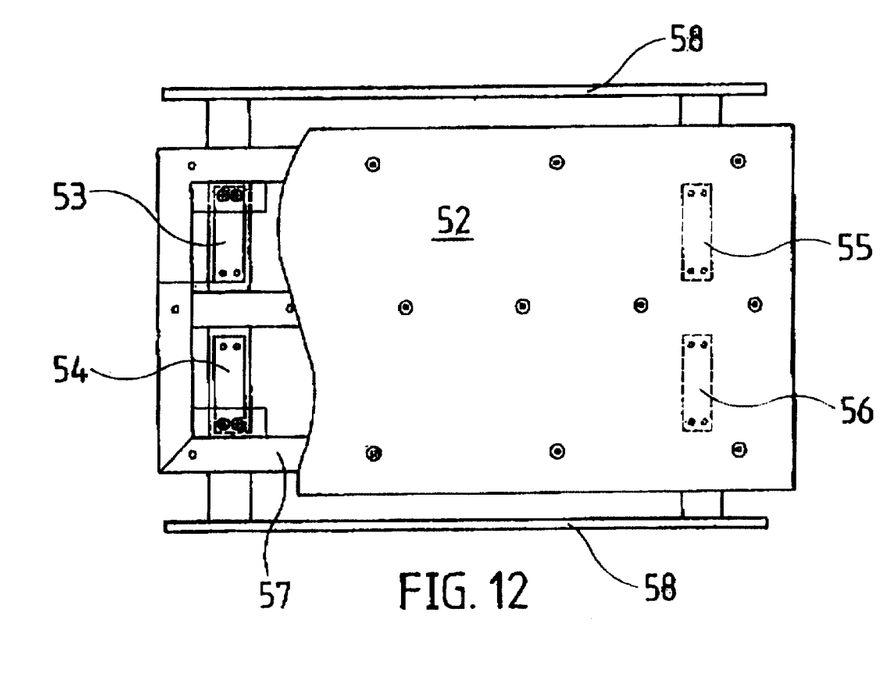
FIG. 12 is a top plan view of a weigh pad of the second embodiment.

A weigh pad 51 for a second embodiment of a mass for rate sensor is illustrated in FIGS. 10 to 12 of the drawings. The second embodiment uses a plate member 52 configured for rectilinear movement within an aperture in a section of the elevator floor (not above). This embodiment removes the requirement for the plate member to be pivoted at an edge. The plate member 52 is fully supported by transducer means whereby, in use, the plate would be positioned substantially coplanar with the floor section.

The transducer means preferably comprise at least three load cells, although four load cells 53, 54, 55 and 56 are disposed under the plate member 52 in the illustrated embodiment. The load cells are arranged to provide flexible support for the plate member 52, mounted in a cantilevered fashion, between a weigh plate frame 57 and a support frame 58. The weigh plate frame carries the plate member 52 and, in use, the support frame 58 is fixed in the elevator housing. Alternative mounting arrangements may use guides. It is noted that a correction factor of other than 2 may be required in equation (2) to calculate the mass flow rate, $F_2(t)$, for this second embodiment using a rectilinearly mounted weigh pad plate which is uniformly sensitive to. It will be appreciated that the mass flow rate sensor of the invention can be incorporated into a yield mapping system further comprising a harvester ground speed sensor and a harvester locating arrangement, preferably using a differential global position system (DGPS) technique. During harvesting operations, the local yield of a crop can be expressed as a function of the material flow rate into the crop harvester, the forward travel speed of the harvester and the cutting width, as shown in equation (3) below:

$$Y(t)=F(t)/(S(t)*W(t)) \ldots \qquad (3)$$

where
 Y, is crop yield [$kg/m^2$];
 F, is material flow rate (kg/s);
 S, is the driving speed of the harvester [m/s];
 W, is the actual cutting width [m]; and
 t, time [s].

Whilst the actual cutting width of the crop harvester is known, the driving speed of the harvester needs to be obtained for the yield calculation. This can be achieved using a rotational sensor on a wheel or track of the harvester or alternatively can be derived from off—the—shelf GPS systems with differential correction facilities.

Figure 13:
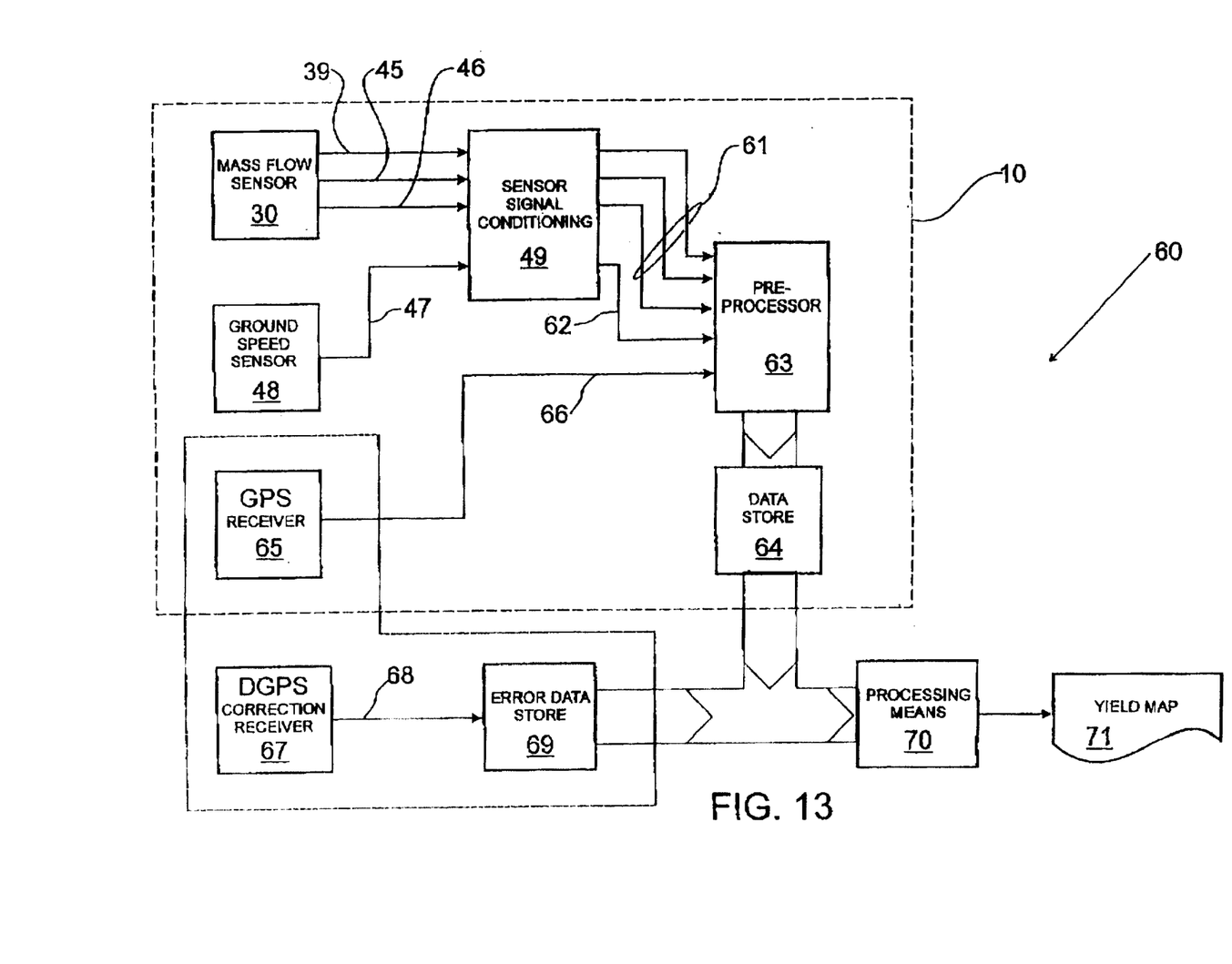
FIG. 13 is a block diagram of a yield mapping system.

A block diagram of a yield mapping system 60 of one embodiment is shown in FIG. 13. The mass flow sensor apparatus 30 provides mass signals 39 from the load cells, proximity signals 45 from a proximity sensor and acceleration signals 46 from an optional accelerometer. The mass, proximity and acceleration signals, along with speed signals 47 from the ground speed sensor 48, are supplied to a sensor signal conditioning circuit 49 wherein signals are filtered and sampled at 100 Hz. The conditioned mass flow 61 and speed 62 signals are then fed to a pre-processor 63, wherein they are corrected for measurement errors and averaged over one second intervals.

A conventional GPS receiver 65 is also mounted on the harvester 10 and provides position signals 66 indicative of the latitude and longitude of the harvester within a field containing the crop. The corrected sensor signals 61, 62 and position signals 66 are recorded against a common time base in a data store 64 by the pre-processor 67. There is generally a delay between the crop being cut and eventually being weighed at the mass flow sensor 30 in the harvester, typically of the order of 5 seconds. This may be taken into account when recording the respective signals, for example the position signals may be delayed by 5 seconds: or during later processing of a data. In order to obtain sufficient accuracy for harvester position in the field mapping application, the differential GPS system relies upon a differential correction receiver 67 to provide sub-meter accuracy.

The differential correction receiver, which may or may not be mounted on the harvester, receives signals from a base station. The base station is at a known location and consequently any errors in the GPS signal received directly by the GPS receiver 65 may be corrected with the assistance of error signals 68 produced by the correction receiver 67. The error signals 68 are recorded in a separate error data store 69, in synchronism with the recording by the pre-processor 63.

Data from both the data store 64 and the error data store 69 is subsequently loaded into a processing means 70 and the corrected harvester position data, mass flow rate data and harvester speed data are integrated using geographic information system (GIS) techniques to produce a yield map 71 of the crop. The yield map may presented on a visual display unit and/or printed as a hard copy. Such yield maps are a valuable tool for crop management purposes, especially in relation to sugar cane which is a high value crop with a significant level of investment on inputs.

An alternative method for pre-processing and recording the mass flow rate data that is particularly suited to the second embodiment of the mass flow rate sensor, because the load cell arrangement is uniformly sensitive to weight along the ull length of the weigh pad plate, may also be employed. Rather than recording a plurality of mass signals from the load cell array and averaging, only one mass signal need be obtained for each discrete quantity or batch of billets. It is most preferable that the mass signal reading is obtained immediately prior to a flight traversing the weigh pad, such that substantially all of the batch is on the weigh pad whilst reducing the risk of a jammed flight introducing errors into the mass signal for that batch.

Increased accuracy may also be obtained by recording the instantaneous linear speed of the elevator for use in the mass flow rate calculation. This can be obtained from a speed sensor on the elevator drive means (as discussed above) or, more economically, by using the proximity sensor's detection of the passing flights to calculate the elevator speed.

Throughout the specification the aim has been to describe the preferred embodiments of the invention without limiting the invention to any one embodiment or specific collection of features.

The claims defining the invention are as follows:

1. A mass flow sensor apparatus for a crop harvester having a crop receiving section, one or more inclined elevator flights leading to an upper elevator section having a floor section that is traversed by portions of a harvested crop carried by the elevator, said mass flow sensor apparatus including:
  a) a weigh pad for receiving portions of the harvested crop;
  b) a first transducer means associated with the weigh pad for producing mass signals indicative of a mass received by the weigh pad; and
  c) an error correction means for correction of measurement errors in said mass signals;
  d) whereby, in use, the weight pad is mounted in the crop harvester at a location substantially co-planar with the floor section such that portions of the harvested crop traverse said weigh pad and the error correction means is operatively associated with said crop harvester, the positioning of the weigh pad in the floor section of the upper elevator section reducing error that may occur in the inclined elevator sections, wherein the weigh pad includes a plate member, that, in use, is movable with respect to the floor section, and
  wherein the plate member includes guides or flexible supports whereby, in use, the plate member moves rectilinearly within an aperture in said floor section.

2. A mass flow sensor apparatus for a crop harvester having a crop receiving section, one or more inclined elevator flights leading to an upper elevator section having a floor section that is traversed by portions of a harvested crop carried by the elevator, said mass flow sensor apparatus including:
  a) a weigh pad for receiving portions of the harvested crop;
  b) a first transducer means associated with the weigh pad for producing mass signals indicative of a mass received by the weigh pad; and
  c) an error correction means for correction of measurement errors in said mass signals;
  d) whereby, in use, the weight pad is mounted in the crop harvester at a location substantially co-planar with the floor section such that portions of the harvested crop traverse said weigh pad and the error correction means is operatively associated with said crop harvester, the positioning of the weigh pad in the floor section of the upper elevator section reducing error that may occur in the inclined elevator sections, wherein the weigh pad includes a plate member, that, in use, is movable with respect to the floor section,
  wherein the plate member includes guides or flexible supports whereby, in use, the plate member moves rectilinearly within an aperture in said floor section, and
  wherein the first transducer means includes at least three load cells disposed under the plate member, preferably integral with the flexible supports.

3. A mass flow sensor apparatus for a crop harvester having a floor section that is traversed by portions of a harvested crop, said mass flow sensor apparatus including:
  a) a weigh pad for receiving portions of the harvested crop;
  b) a first transducer means associated with the weigh pad for producing mass signals indicative of a mass received by the weigh pad; and
  c) an error correction means for correction of measurement errors in said mass signals;
  d) whereby, in use, the weight pad is mounted in the crop harvester at a location substantially co-planar with the floor section such that portions of the harvested crop traverse said weigh pad and the error correction means is operatively associated with said crop harvester, wherein the weigh pad includes a plate member that, in use, is movable with respect to the floor section and, wherein, the plate member includes guides or flexible supports whereby, in use, the plate member moves rectilinearly within an aperture in said floor section.

4. A mass flow sensor apparatus for a crop harvester having a floor section that is traversed by portions of a harvested crop, said mass flow sensor apparatus including:
  a) a weigh pad for receiving portions of the harvested crop;
  b) a first transducer means associated with the weigh pad for producing mass signals indicative of a mass received by the weigh pad; and
  c) an error correction means for correction of measurement errors in said mass signals;
  d) whereby, in use, the weight pad is mounted in the crop harvester at a location substantially co-planar with the floor section such that portions of the harvested crop traverse said weigh pad and the error correction means is operatively associated with said crop harvester, wherein the weigh pad includes a plate member that, in use, is movable with respect to the floor section and, wherein, the plate member includes guides or flexible supports whereby, in use, the plate member moves rectilinearly within an aperture in said floor section,
  wherein the first transducer means includes at least three load cells disposed under the plate member and integral with the flexible supports.

* * * * *